US012337274B2

(12) United States Patent
Patel (10) Patent No.: US 12,337,274 B2
(45) Date of Patent: Jun. 24, 2025

(54) METHODS FOR ABSORPTION AND DESORPTION OF CARBON DIOXIDE

(71) Applicant: Saudi Arabian Oil Company, Dhahran (SA)

(72) Inventor: Hasmukh A. Patel, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 552 days.

(21) Appl. No.: 17/856,566

(22) Filed: Jul. 1, 2022

(65) Prior Publication Data
US 2024/0001291 A1   Jan. 4, 2024

(51) Int. Cl.
*B01D 53/14* (2006.01)
(52) U.S. Cl.
CPC ..... *B01D 53/1493* (2013.01); *B01D 53/1425* (2013.01); *B01D 53/1475* (2013.01); *B01D 2252/2053* (2013.01)
(58) Field of Classification Search
CPC ............ B01D 53/1493; B01D 53/1425; B01D 53/1475; B01D 2252/2053
See application file for complete search history.

(56) References Cited

U.S. PATENT DOCUMENTS 3,607,941 A    9/1971 Bailey
6,166,254 A   12/2000 Sahbari et al.
(Continued)

FOREIGN PATENT DOCUMENTS

CN    104271219 A    1/2015
TW    201126195 A    8/2011
(Continued)

OTHER PUBLICATIONS

Petrovic et al., "Influence of surface modification on selective CO2 adsorption: A technical review on mechanisms and methods", Microporous and Mesoporous Materials, vol. 312, 110751, 41 pages, 2021.
(Continued)

*Primary Examiner* — Robert Clemente
(74) *Attorney, Agent, or Firm* — Dinsmore & Shohl LLP (57) ABSTRACT

According to embodiments disclosed herein, a method for absorption and desorption of $CO_2$ may comprise absorbing $CO_2$ onto an absorbent solution comprising a $CO_2$-depleted amidoxime compound, wherein absorbing $CO_2$ onto the absorbent solution comprising the $CO_2$-depleted amidoxime compound may comprise contacting the absorbent solution with a gas comprising $CO_2$ at a first temperature to form an absorbent solution comprising a $CO_2$-enriched amidoxime compound; and then desorbing the $CO_2$ from the absorbent solution comprising the $CO_2$-enriched amidoxime compound, wherein desorbing the $CO_2$ from the absorbent solution comprising the $CO_2$-enriched amidoxime compound may comprise heating the absorbent solution comprising the $CO_2$-enriched amidoxime compound to a second temperature greater than the first temperature to remove at least a portion of the $CO_2$ from the $CO_2$-enriched amidoxime compound and form the $CO_2$-depleted amidoxime compound, wherein the second temperature is less than or equal to 80° C.

18 Claims, 1 Drawing Sheet

(56) References Cited

U.S. PATENT DOCUMENTS

| | | |
|---|---|---|
| 10,065,148 B2 | 9/2018 | Lail et al. |
| 2016/0030880 A1* | 2/2016 | Wong ............... B01D 53/1425 |
| | | 95/178 |
| 2023/0056553 A1* | 2/2023 | Hopkinson ........... H01M 10/52 |

FOREIGN PATENT DOCUMENTS

| | | |
|---|---|---|
| WO | 2009058287 A1 | 5/2009 |
| WO | 2013078123 A1 | 5/2013 |

OTHER PUBLICATIONS

Zulfiqar et al., "Amidoximes: promising candidates for CO2 capture", Energy & Environmental Science, vol. 4, 4528-4531, 2011.
Notification of Transmittal of the International Search Report and the Written Opinion of the International Searching Authority, or the Declaration dated Oct. 16, 2023 pertaining to International application No. PCT/US2023/025578 filed Jun. 16, 2023, pp. 1-13.
Gunathilake, Chamila et al. "Amidoxime-Functionalized Microcrystalline Cellulose•Mesoporous Silica Composites for Carbon Dioxide Sorption at Elevated Temperatures" Journal of Materials Chemistry A, Jan. 1, 2016, pp. 4808-4819, vol. 4, No. 13.

\* cited by examiner

METHODS FOR ABSORPTION AND DESORPTION OF CARBON DIOXIDE

TECHNICAL FIELD

The present disclosure relates to the absorption and desorption of $CO_2$ and, more specifically, to processes for absorbing and desorbing $CO_2$ onto and off of chemical compounds.

BACKGROUND

Various manufacturing processes produce gases that may enter the atmosphere and have a negative impact on the environment. One particular gas that causes a negative impact on the environment is carbon dioxide ($CO_2$). Known processes may attempt to absorb $CO_2$ into a chemical substance. However, these processes are generally inefficient and new methods for absorbing $CO_2$ are needed.

SUMMARY

Conventional processes for $CO_2$ absorption may have several deficiencies. For example, many of these conventional processes utilize compounds that cannot be used multiple times in a cyclical process, thus requiring a larger amount of these absorbent compounds and increasing the cost to the user. Additionally, many of these conventional processes may require a relatively high temperature (such as 100° C. or greater) in order to remove $CO_2$ from an absorbent compound, again increasing the cost to the user that has to heat the compound to these relatively high temperatures. Described herein are processes for $CO_2$ absorption and desorption which may, in some embodiments, overcome these deficiencies. According to embodiments described herein, an amidoxime compound may contact a gas comprising $CO_2$ in order to absorb $CO_2$. The amidoxime compound can then release the $CO_2$ when heated to relatively mild temperatures, such as no more than 80° C. In addition, the amidoxime compound may again be repeatedly contacted with the $CO_2$ in a gas to form a $CO_2$-enriched amidoxime compound. As such, since the amidoxime compound may be cyclically used to absorb and desorb $CO_2$ from the gas, this should also reduce the costs associated with this process.

According to one or more embodiments of the present disclosure, a method for absorption and desorption of $CO_2$ comprises absorbing $CO_2$ onto an absorbent solution comprising a $CO_2$-depleted amidoxime compound, wherein absorbing $CO_2$ onto the absorbent solution comprising the $CO_2$-depleted amidoxime compound comprises contacting the absorbent solution with a gas comprising $CO_2$ at a first temperature to form an absorbent solution comprising a $CO_2$-enriched amidoxime compound; and desorbing the $CO_2$ from the absorbent solution comprising the $CO_2$-enriched amidoxime compound, wherein desorbing the $CO_2$ from the absorbent solution comprising the $CO_2$-enriched amidoxime compound comprises heating the absorbent solution comprising the $CO_2$-enriched amidoxime compound to a second temperature greater than the first temperature to remove at least a portion of the $CO_2$ from the $CO_2$-enriched amidoxime compound and form the $CO_2$-depleted amidoxime compound, wherein the second temperature is less than or equal to 80° C.

These and other embodiments are described in more detail in the Detailed Description. It is to be understood that both the foregoing general description and the following detailed description present embodiments of the invention, and are intended to provide an overview or framework for understanding the nature and character of the invention as it is claimed. The accompanying drawing is included to provide a further understanding of the invention and are incorporated into and constitute a part of this specification. The drawing illustrates various embodiments and, together with the description, serve to explain the principles and operations of the invention. Additionally, the drawing and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following FIGURE, where like structure is indicated with like reference numerals and wherein.

DETAILED DESCRIPTION

References will now be made in greater detail to various embodiments, some embodiments of which are illustrated in the accompanying drawing. According to one or more embodiments, methods for absorbing and desorbing $CO_2$ may comprise absorbing $CO_2$ onto an absorbent solution comprising a $CO_2$-depleted amidoxime compound to form an absorbent solution comprising a $CO_2$-enriched amidoxime compound, and then desorbing the $CO_2$ from the absorbent solution comprising the $CO_2$-enriched amidoxime compound. The process of absorbing and desorbing may be repeated, such as in a continuous cycle. Absorbing $CO_2$ onto the absorbent solution comprising the $CO_2$-depleted amidoxime compound may generally comprise contacting the absorbent solution with a gas comprising $CO_2$ at a relatively low temperature (sometimes referred to herein as a "first temperature") to form an absorbent solution comprising a $CO_2$-enriched amidoxime compound. Desorbing the $CO_2$ from the absorbent solution comprising the $CO_2$-enriched amidoxime compound may comprise heating the absorbent solution comprising the $CO_2$-enriched amidoxime compound to an elevated temperature (sometimes referred to herein as a "second temperature") that is greater than the relatively low temperature to remove at least a portion of the $CO_2$ from the $CO_2$-enriched amidoxime compound and form the $CO_2$-depleted amidoxime compound. In embodiments described herein, the elevated temperature may be less than or equal to 80° C., which may be lower than temperatures needed in conventional processes which do not utilize amidoxime compounds as absorbent materials. In such embodiments, the absorbent solution can be contacted with $CO_2$ at a relatively cool temperature, and then the absorbent solution can be heated to release $CO_2$ to be selectively captured or sequestered.

As described herein, the term "absorbent solution" may refer to any mixture composed of two or more substances that is able to absorb at least a portion of $CO_2$ from a gas stream comprising $CO_2$. Further, as described herein, the term "$CO_2$-enriched amidoxime" or "$CO_2$-enriched amidoxime compound" refers to an amidoxime compound that has absorbed some $CO_2$ from a process stream comprising $CO_2$.

As described herein, the term "$CO_2$-depleted amidoxime" or "$CO_2$-depleted amidoxime compound" refers to an amidoxime compound that has had at least a portion of the $CO_2$ that was absorbed onto the amidoxime compound removed. Generally, the $CO_2$-enriched amidoxime compound has been exposed to an environment of $CO_2$ at a relatively low temperature where $CO_2$ is absorbed, and a $CO_2$-depleted amidoxime compound has been heated as to desorb $CO_2$ and has not yet re-absorbed $CO_2$. As would be understood by those skilled in the art, some absorption sites on the $CO_2$-enriched amidoxime compounds are void of $CO_2$ and some absorption sites of $CO_2$-depleted amidoxime compounds include $CO_2$. However, generally, $CO_2$-enriched amidoxime compounds have more absorbed $CO_2$ than $CO_2$-depleted amidoxime compounds.

In one or more embodiments, the gas stream comprising $CO_2$ may be any gas stream that comprises $CO_2$ in amounts greater than that in air. In some embodiments, the gas stream may be a process gas stream, such as those from energy generation stations or chemical plants, and the gas steam is not particularly limited. In various embodiments, the gas stream may comprise at least 0.1 mol. % $CO_2$, at least 1 mol. % $CO_2$, at least 5 mol. % $CO_2$, at least 10 mol. % $CO_2$, at least mol. % $CO_2$, at least 30 mol. % $CO_2$, at least 40 mol. % $CO_2$, at least 50 mol. % $CO_2$, at least 60 mol. % $CO_2$, at least 70 mol. % $CO_2$, at least 80 mol. % $CO_2$, or at least 90 mol. % $CO_2$. In one or more embodiments, the gas stream may comprise from 0.1 mol. % $CO_2$ to 100 mol. % $CO_2$, such as from 0.1 mol. % $CO_2$ to 90 mol. % $CO_2$, 0.1 mol. % $CO_2$ to 80 mol. % $CO_2$, 0.1 mol. % $CO_2$ to 70 mol. % $CO_2$, 0.1 mol. % $CO_2$ to 60 mol. % $CO_2$, 0.1 mol. % $CO_2$ to 50 mol. % $CO_2$, 0.1 mol. % $CO_2$ to 40 mol. % $CO_2$, 0.1 mol. % $CO_2$ to 30 mol. % $CO_2$, 0.1 mol. % $CO_2$ to 20 mol. % $CO_2$, or 0.1 mol. % $CO_2$ to 10 mol. % $CO_2$. In one or more embodiments, the gas stream may comprise from mol. % $CO_2$ to 100 mol. % $CO_2$, such as from 20 mol. % $CO_2$ to 100 mol. % $CO_2$, 30 mol. % $CO_2$ to 100 mol. % $CO_2$, 40 mol. % $CO_2$ to 100 mol. % $CO_2$, 50 mol. % $CO_2$ to 100 mol. % $CO_2$, 60 mol. % $CO_2$ to 100 mol. % $CO_2$, 70 mol. % $CO_2$ to 100 mol. % $CO_2$, 80 mol. % $CO_2$ to 100 mol. % $CO_2$, or mol. % $CO_2$ to 100 mol. % $CO_2$.

In one or more embodiments, the absorbent solution comprises, consists essentially of, or consists of one or more solvents and one or more amidoxime compounds. The solvent may be water, or other suitable solvents such as organic solvents. In one or more embodiments, the absorbent solution may comprise from 0.1 wt. % to 10 wt. % of amidoxime compound. For example, the absorbent solution may comprise from 0.5 wt. % to 10 wt. % of amidoxime compound, such as from 1 wt. % to 10 wt. %, from 2.5 wt. % to 10 wt. %, or from 5 wt. % to 10 wt. % of amidoxime compound. In one or more embodiments, the absorbent solution may comprise from wt. % to 5 wt. %, from 0.1 wt. % to 2.5 wt. %, or from 0.1 wt. % to 1 wt. % of amidoxime compound. In one or more embodiments, the absorbent solution may comprise from 1 wt. % to 7.5 wt. %, 1 wt. % to 5 wt. %, or 1 wt. % to 2.5 wt. % of amidoxime compound. Two or more chemical species that are amidoxime compounds may be included in the amidoxime compound present in the absorbent solution. In one or more embodiments, the absorbent solution may comprise from 90 wt. % to 99.9 wt. % of solvent, such as water. For example, the absorbent solution may comprise from 92 wt. % to 99.9 wt. %, from 94 wt. % to 99.9 wt. %, 96 wt. % to 99.9 wt. %, or 98 wt. % to 99.9 wt. % of solvent. In or more embodiments, the absorbent solution may comprise from 90 wt. % to 99 wt. %, from 90 wt. % to 98 wt. %, from 90 wt. % to 96 wt. %, from 90 wt. % to 94 wt. %, or from 90 wt. % to 92 wt. % of solvent.

As described herein, the term "amidoxime" or "amidoxime compound" may refer to a chemical with the general formula:

As is depicted, in one or more embodiments, the amidoxime compound may have a chemical structure with at least one —C(NOH)NH$_2$ functional group. The —C(NOH)NH$_2$ functional group comprises a —NH$_2$ functional group that forms a single bond with the carbon atom of the —C(NOH)NH$_2$ functional group. The —C(NOH)NH$_2$ further comprises a =NOH functional group that forms a double bond with the carbon atom of the —C(NOH)NH$_2$ functional group.

In one or more embodiments, $R_i$ may have any chemical structure, and the structure of $R_i$ is not necessarily limited. In some embodiments, $R_i$ may comprise a —C(NOH)NH$_2$ functional group, such that multiple —C(NOH)NH$_2$ functional groups are present on the amidoxime compound. It is contemplated that the amidoxime compounds described herein may comprise 1, 2, 3, 4, 5, 6, 7, 8, 9, 10, or even more —C(NOH)NH$_2$ functional groups.

According to various embodiments, $R_i$ may be the functional group —(CH$_2$)$_4$C(NOH)NH$_2$. In another embodiment, $R_i$ may be the functional group —(CH$_2$)$_2$C(NOH)NH$_2$. In another embodiment, $R_i$ may be the functional group —CH$_2$C(NOH)NH$_2$. In another embodiment, $R_i$ may be the functional group —CH$_3$. In one or more embodiments, the amidoxime compound may be selected from the group including N'1,N'6-dihydroxyhexanediimidamide, N'1,N'4-dihydroxybutanediimidamide, N'1,N'3-dihydroxypropanediimidamide, N'-hydroxyethanimidamide, combination of these, or the like.

According to one or more embodiments, the process of forming an amidoxime compound may comprise contacting a nitrile compound with a solution. The term "nitrile compound" may refer to a compound with the general formula R—C≡N, where R may have any chemical structure, and the structure of R is not necessarily limited. In some embodiments, the nitrile compound may comprise one —C≡N functional group, where the carbon is triple bonded to the nitrogen. In additional embodiments, the nitrile compound may comprise a chemical structure with two —C≡N functional groups. In additional embodiments, the nitrile compound may comprise a chemical structure with more than two —C≡N functional groups. In one or more embodiments, the nitrile compound may be selected from the group including adiponitrile, succinonitrile, malononitrile, acetonitrile, a combination of these, or the like.

In one or more embodiments, the solution that the nitrile compound may contact to form the amidoxime compound may comprise hydroxylamine. In one or more embodiments, the hydroxylamine may be in an aqueous solution. In one or more embodiments, the hydroxylamine may be a salt. For example, in one or more embodiments, the hydroxylamine salt may comprise hydroxylamine hydrochloride.

In one or more embodiments, the solution that the nitrile compound may contact to form the amidoxime compound may comprise a solvent. In one or more embodiments, the solution that the nitrile compound may contact to form the amidoxime compound may comprise an alcoholic solvent including ethanol, methanol, propanol, combinations thereof, or similar solvent with at least one hydroxyl functional group. In one or more embodiments, the solution that the nitrile compound may contact to form the amidoxime compound may comprise chlorinated solvents including chloroform, dichloromethane, chlorobenzene, combinations thereof, or similar solvent with at least one —CCl functional group.

In one or more embodiments, the solution that the nitrile compound may contact to form the amidoxime compound may contain polar solvents. "Polar solvents" refer to solvents that have large partial charges or dipole moments where the bonds between the atoms have very different electronegativities. In one or more embodiments, the solution that the nitrile compound may contact to form the amidoxime compound may contain nonpolar solvents. "Nonpolar solvents" refer to solvents that contain bonds between atoms with similar electronegativities. In one or more embodiments, the solution that the nitrile compound may contact to form the amidoxime compound may contain polar solvents, nonpolar solvents, or combinations thereof.

In one or more embodiments, the molar ratio of the nitrile compound to the hydroxylamine may range from 1:1 to 1:10 in order to achieve complete conversion of the nitrile compound to the respective amidoxime compound. In one or more embodiments, the molar ratio of the nitrile compound to the hydroxylamine may be 1:1, may be 1:2.5, may be 1:5, may be 1:10, or the amount of moles of hydroxylamine used to form the amidoxime compound may be more than 10 times the amount of moles of the nitrile compound used to form the amidoxime compound.

In one or more embodiments, the amount of moles of the nitrile compound used to form the amidoxime compound may be less than the amount of moles of the hydroxylamine used to form the amidoxime compound. In some embodiments, this molar ratio may result in the partial formation of the amidoxime compound where not all of the nitrile compound is converted to the amidoxime compound. In one or more embodiments, the molar ratio of the nitrile compound to the hydroxylamine may be 0.9:1, may be 0.7:1, may be 0.5:1, may be 0.3:1, may be 0.1:1, or the amount of moles of the nitrile compound used to form the amidoxime compound may be less than 10 times the amount of moles of the hydroxylamine used to form the amidoxime compound.

In one or more embodiments, the amidoxime compound may absorb $CO_2$ and form a $CO_2$-enriched amidoxime compound. The $CO_2$ may bind to the —$NH_2$ functional group of the amidoxime compound. For example, in one or more embodiments, one of the oxygen atoms of the $CO_2$ may form a hydrogen bond with one of the hydrogen atoms of the —$NH_2$ functional group of the amidoxime compound. In one or more embodiments, the $CO_2$ may bind to the =NOH functional group of the amidoxime compound. For example, in one or more embodiments, one of the oxygen atoms of the $CO_2$ may form a hydrogen bond with the hydrogen atom of the =NOH functional group of the amidoxime compound. In one or more embodiments, the $CO_2$ may bind to both the —$NH_2$ functional group and the =NOH functional group of the amidoxime compound.

In one or more embodiments, the weight ratio of the absorbed $CO_2$ to the $CO_2$-depleted amidoxime compound is less than or equal to 1:95 at the elevated temperature. This means that when the elevated temperature is reached, the weight of the $CO_2$-depleted amidoxime compound is at least 95 times greater than the weight of the absorbed $CO_2$. In some embodiments, the weight ratio of absorbed $CO_2$ to $CO_2$-depleted amidoxime compound is less than or equal to 1:95, is less than or equal to 1:96, is less than or equal to 1:97, is less than or equal to 1:98, or is less than or equal to 1:99 at the elevated temperature. In one or more embodiments, the weight ratio of absorbed $CO_2$ to $CO_2$-enriched amidoxime compound is at least 20:80 at the relatively low temperature. This means that when the system is at the relatively low temperature, the weight of the $CO_2$-enriched amidoxime compound is at most 4 times greater than the weight of the absorbed $CO_2$. In some embodiments, the weight ratio of absorbed $CO_2$ to $CO_2$-enriched amidoxime compound is at least 20:80, is at least 25:75, is at least 30:70, is at least 35:65, or is at least 40:60 at the relatively low temperature.

In one or more embodiments, the absorbent solution comprising the $CO_2$-enriched amidoxime compound may be heated to an elevated temperature ranging from 40° C. to 80° C. in order to remove $CO_2$ from the $CO_2$-enriched amidoxime compound and form the $CO_2$-depleted amidoxime compound. In one or more embodiments, the absorbent solution comprising the $CO_2$-enriched amidoxime compound may be heated to an elevated temperature of from 45° C. to 80° C., from 50° C. to 80° C., from 55° C. to 80° C., from 60° C. to 80° C., from 65° C. to 80° C., or from 70° C. to 80° C. In one or more embodiments, the absorbent solution comprising the $CO_2$-enriched amidoxime compound may be heated to an elevated temperature of from 40° C. to 75° C., from 40° C. to 70° C., from 40° C. to 65° C., from 40° C. to 60° C., from 40° C. to 55° C., or from 40° C. to 50° C. In one or more embodiments, the absorbent solution comprising the $CO_2$-enriched amidoxime compound may be heated to an elevated temperature of from 45° C. to 75° C., from 50° C. to 70° C., or from 55° C. to 65° C.

In one or more embodiments, the heating of the $CO_2$-enriched amidoxime compound may result in the removal of $CO_2$ from the $CO_2$-enriched amidoxime compound. The bond between one of the oxygen atoms of the $CO_2$ and one of the hydrogen atoms of the —$NH_2$ functional group of the $CO_2$-enriched amidoxime compound may break. The bond between one of the oxygen atoms of the $CO_2$ and the hydrogen atom of the =NOH functional group of the $CO_2$-enriched amidoxime compound may break. In some embodiments, the bond between one of the oxygen atoms of the $CO_2$ and one of the hydrogen atoms of the —$NH_2$ functional group of the $CO_2$-enriched amidoxime compound and the bond between one of the oxygen atoms of the $CO_2$ and the hydrogen atom of the =NOH functional group of the $CO_2$-enriched amidoxime compound both may break.

In one or more embodiments, the lowering of the temperature of the absorbent solution comprising the $CO_2$-depleted amidoxime compound may lower the temperature of the absorbent solution to a temperature of from 5° C. to 50° C. In some embodiments, the lowering of the temperature of the absorbent solution comprising the $CO_2$-depleted amidoxime compound may lower the temperature of the absorbent solution to a temperature of from 5° C. to 45° C., from 5° C. to 40° C., from 5° C. to 35° C., from 5° C. to 30° C., from 5° C. to 25° C., from 5° C. to 20° C., or from 5° C. to 15° C. In some embodiments, the lowering of the temperature of the absorbent solution comprising the $CO_2$-depleted amidoxime compound may lower the temperature of the absorbent solution to a temperature of from 10° C. to 50° C., from 15° C. to 50° C., from 20° C. to 50° C., from 25° C. to 50° C., from 30° C. to 50° C., from 35° C. to 50° C., or from 40° C. to 50° C. In some embodiments, the lowering of the temperature of the absorbent solution comprising the $CO_2$-depleted amidoxime compound may lower the temperature of the absorbent solution to a temperature of from 10° C. to 45° C., from 15° C. to 40° C., or from 20° C. to 40° C.

In one or more embodiments, the process of absorbing $CO_2$ to the amidoxime compound and desorbing $CO_2$ from the amidoxime compound may be a continuous process. The term "continuous process" may refer to continuously cycling the absorbent solution from a high temperature environment region to a low temperature environment region to selectively absorb and desorb $CO_2$. In such embodiments, a continuous stream of absorbent solution may cycle between two process units where absorption and desorption take place. In other embodiments, the process of absorbing $CO_2$ to the amidoxime compound and desorbing $CO_2$ from the amidoxime compound may be a batch process. The term "batch process" may refer to processes where $CO_2$ is absorbed and desorbed in a common vessel by adjusting the temperature.

In one or more embodiments, the process of absorbing $CO_2$ to the amidoxime compound and desorbing $CO_2$ from the amidoxime compound may be repeated from 1 to 100 times. In one or more embodiments, the process of absorbing $CO_2$ to the amidoxime compound and desorbing $CO_2$ from the amidoxime compound may be repeated at least 1 time, at least 2 times, at least 5 times, at least 10 times, at least 20 times, at least 50 times, or at least 100 times.

In one or more embodiment, the methods for absorbing and desorbing $CO_2$ may utilize a scrubber unit. Now, with reference to FIG. 1, a wet scrubber unit 100 is depicted. $CO_2$ absorption may take place in the wet scrubber unit 100, as is described in detail herein. The term "wet scrubber unit" refers to any process unit where a gas target composition is absorbed into a liquid by direct contact between the gas and the liquid.

Figure 1:
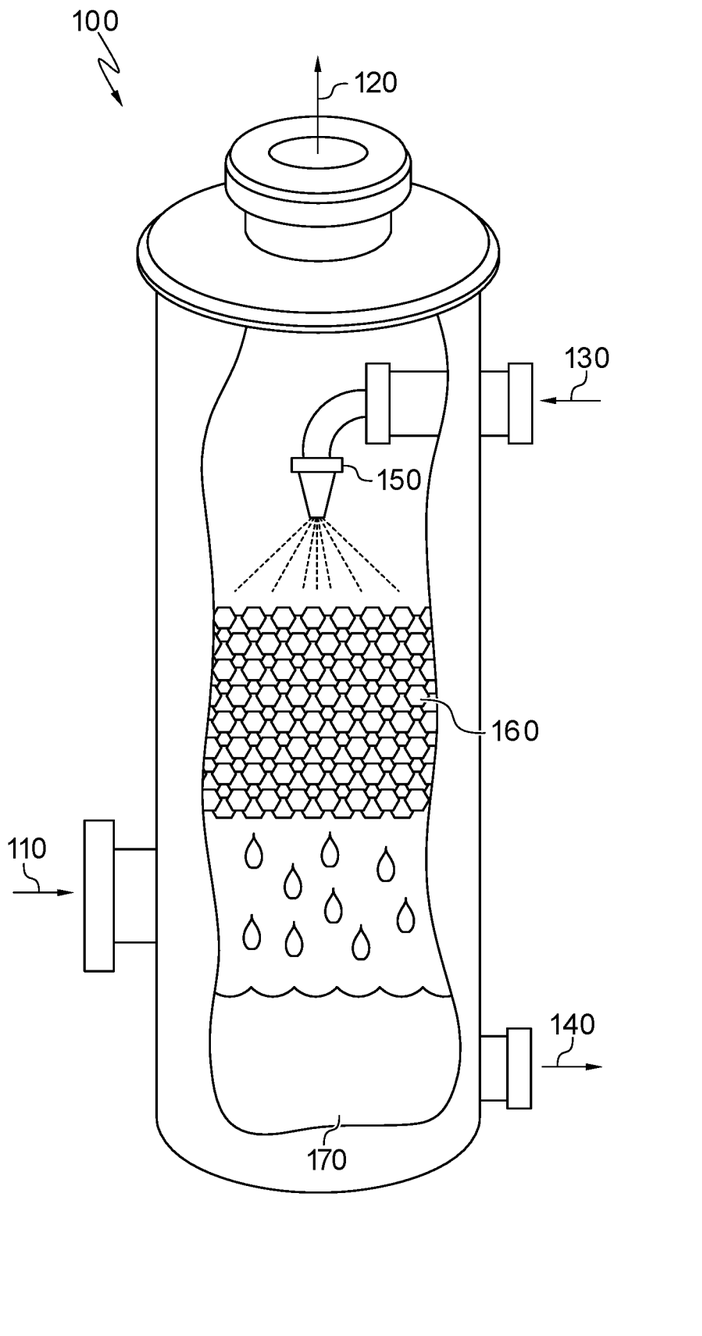
FIG. 1 is a schematic depiction of a wet scrubber unit where a gas comprising $CO_2$ may contact an absorbent solution comprising at least one amidoxime compound, in accordance with one or more embodiments of the present disclosure.

Still referring to FIG. 1, in some embodiments, an input gas stream 110 may enter the wet scrubber unit 100 where the input gas stream 110 comprises a gas stream comprising $CO_2$. This gas stream comprising $CO_2$ may be any process gas stream, such as those from energy generation stations or other chemical plants, and the gas steam is not particularly limited. An input liquid stream 130 may enter the wet scrubber unit 100 where the input liquid stream 130 comprises the absorbent solution described herein. The input gas stream 110 may flow upwards into the wet scrubber unit 100 and flow through the packed bed 160, which may be an inert bed that enhances gas/liquid contact, as is understood in the art. The input liquid stream 130 may pass through a liquid distributor 150 and flow downward though the packed bed 160. The input gas stream 110 flowing upwards through the packed bed 160 and the input liquid stream 130 flowing downward through the packed bed 160 may contact at a relatively low temperature, where the amidoxime compound from the input liquid stream 130 may absorb $CO_2$ from the input gas stream 110 to form a $CO_2$-enriched amidoxime compound. For example, the wet scrubber unit 100 may operate at the relatively low temperatures described herein, such as at room temperature.

Still referring to FIG. 1, in one or more embodiments, the absorbent solution comprising the $CO_2$-enriched amidoxime compound may fall and collect in the liquid reservoir 170 of the wet scrubber unit 100. The gas that now comprises less $CO_2$ as the input gas stream 110 may continue to flow upward and exit the wet scrubber unit 100 in an output gas stream 120. The absorbent solution comprising the $CO_2$-enriched amidoxime compound in the liquid reservoir 170 may exit the wet scrubber unit 100 in an output liquid stream 140.

In some embodiments, the absorbent solution in the output liquid stream 140 may be heated to an elevated temperature that is greater than the relatively low temperature so that $CO_2$ is removed from at least a portion of the $CO_2$-enriched amidoxime compound and forms a $CO_2$-depleted amidoxime compound. The temperature of the absorbent solution comprising the $CO_2$-depleted amidoxime compound may then be lowered. In some embodiments, the absorbent solution comprising the $CO_2$-depleted amidoxime compound may be introduced again into the wet scrubber unit 100 through the input liquid stream 130 where the absorption and desorption process of the $CO_2$ onto and off the absorbent solution comprising the $CO_2$-depleted amidoxime compound may occur multiple times in a continuous cycle.

EXAMPLES

Examples are provided herein which may disclose one or more embodiments of the present disclosure. However, the Examples should not be viewed as limiting on the claimed embodiments hereinafter provided.

Example 1—Synthesis of N'1,N'6-dihydroxyhexanediimidamide from Adiponitrile 0.018 mol (2.0 g) of adiponitrile and 0.055 mol (3.7 g) of hydroxylamine (50% solution in water) were mixed in a round bottom flask. The reaction mixture was stirred at 75° C. for 5 hours under $N_2$ atmosphere. The reaction mixture was cooled to room temperature and the precipitates were isolated by filtration, washed with 10 mL of water, and dried at 100° C. under vacuum overnight.

Example 2—Synthesis of N'1,N'4-dihydroxybutanediimidamide from Succinonitrile 0.025 mol (2.0 g) of succinonitrile and 0.075 mol (4.94 g) of hydroxylamine (50% solution in water) were mixed in a round bottom flask. The reaction mixture was stirred at 50° C. for 5 hours under $N_2$ atmosphere. The reaction mixture was cooled to room temperature and the precipitates were isolated by filtration, washed with 10 mL of water, and dried at 100° C. under vacuum overnight.

Example 3—Synthesis of N'1,N'3-dihydroxypropanediimidamide from Malononitrile 0.049 mol (2.0 g) of malononitrile and 0.091 mol (6.0 g) of hydroxylamine (50% solution in water) were mixed in a round bottom flask. The reaction mixture was stirred at 40° C. for 5 hours under $N_2$ atmosphere. The reaction mixture was cooled to room temperature and the precipitates were isolated by filtration, washed with 10 mL of water, and dried at 100° C. under vacuum overnight.

Example 4—Synthesis of N'-hydroxyethanimidamide from Acetonitrile 0.048 mol (2.0 g) of acetonitrile and 0.073 mol (4.83 g) of hydroxylamine (50% solution in water) were mixed in a round bottom flask. The reaction mixture was stirred at 40° C. for 5 hours under $N_2$ atmosphere. The reaction mixture was cooled to room temperature and the precipitates were isolated by filtration, washed with 10 mL of water, and dried at 100° C. under vacuum overnight.

Example 5—Thermal Stability of Amidoxime Functionalized Compounds

Thermogravimetric analysis (TGA) of certain amidoxime compounds (N'1,N'6-dihydroxyhexanediimidamide (ADP-Am), N'1,N'4-dihydroxybutanediimidamide (SCN-Am), and N'1,N'3-dihydroxypropanediimidamide (MAL-AMm)) was used to understand the thermal stability of these materials. 10-20 mg of the samples were heated under air flow (50 mL/min) at 10° C./min and up to 800° C. The ADP-Am, SCN-Am and MAL-Am were found to be thermally stable for a temperature up to 176.7° C. and the weight loss between 180-225° C. corresponds to the removal of amidoxime functionalities. The mass loss of 37.9 wt. %, 44.6 wt. %, and 51.3 wt. % for ADP-Am, SCN-Am, and MAL-Am, respectively, was observed due to the loss of amidoxime groups from the compounds. The high thermal stability (>175° C.) for all the amidoxime compounds suggest that these compounds can easily be heated to a desired temperature to desorb $CO_2$ from the materials without degradation.

Example 6—Measurements of $CO_2$ Absorption Capacity of Amidoxime Compounds 1.0 g of amidoxime compound selected from N'1,N'6-dihydroxyhexanediimidamide (ADP-Am), N'1,N'4-dihydroxybutanediimidamide (SCN-Am), N'1,N'3-dihydroxypropanediimidamide (MAL-AMm), and N'-hydroxyethanimidamide (ACN-Am) was dissolved in 100 mL of de-ionized water. $CO_2$ was bubbled through each solution at 10 mL/minute. The $CO_2$ absorption capacities of the amidoxime compounds were measured at 25° C. and 40° C. The time that the $CO_2$ was allowed to absorb to the amidoxime compound was 30 minutes. The changes in the weight of the samples were recorded to calculate the $CO_2$ absorption capacity based on the mass of the amidoxime compound employed for the measurements.

The $CO_2$ absorption capacity of ADP-Am, SCN-Am, MAL-Am, and ACN-Am was observed to be 20.2%, 23.2%, 25.0%, and 23.1%, respectively at 25° C. The $CO_2$ absorption capacity was decreased at the higher temperature. The ADP-Am, SCN-Am, MAL-Am, and ACN-Am resulted in a $CO_2$ absorption capacity of 15.2%, 18.3%, 20.1%, and 17.8%, respectively at 40° C.

Example 7—Measurements of $CO_2$ Desorption Temperature Range Off of the Amidoxime Compounds 1.0 g of N'1,N'6-dihydroxyhexanediimidamide (ADP-Am) was dissolved in 100 mL of deionized water two times in order to form two separate solutions. $CO_2$ was bubbled through one of the solutions at 10 mL/minute so that the $CO_2$ could absorb to the amidoxime compounds. No $CO_2$ was bubbled through the other solution. Once the $CO_2$ absorption was completed, that solution was kept for 24 hours in static condition at room temperature. Both solutions were then subjected to thermogravimetric analysis (TGA) to evaluate and determine the $CO_2$ desorption temperature for the solution with the $CO_2$-enriched amidoxime compounds. The $CO_2$-enriched ADP-Am amidoxime solution showed a 12.8 wt. % mass loss between 50-80° C., which corresponds to the desorption of $CO_2$ from the $CO_2$-enriched ADP-Am amidoxime compound. The amidoxime compounds demonstrated desorption of $CO_2$ from the $CO_2$-enriched amidoxime compounds at much lower temperatures than many conventional liquid amine solvents that require a desorption temperature of over 120° C.

Example 8—Cyclic $CO_2$ Absorption and Desorption Capabilities of the Amidoxime Compounds 1.0 g of N'1,N'6-dihydroxyhexanediimidamide (ADP-Am) was dissolved in 100 mL of deionized water. $CO_2$ gas was bubbled through this solution for 30 minutes at 25° C. in order to measure the $CO_2$ absorption capacity. Then, the same solution with the $CO_2$-enriched amidoxime compounds was heated to 80° C. in order to calculate the $CO_2$ desorption. Five cycle of $CO_2$ absorption and desorption was carried out to measure the effectiveness of the ADP-Am compound. There was no loss in $CO_2$ absorption capacity noticed over the absorption and desorption cycles. The $CO_2$ absorption capacity was observed to be between 19.9-20.2% for the cyclic $CO_2$ absorption and desorption experiment.

The present disclosure includes one or more non-limiting aspects. A first aspect includes a method for absorption and desorption of $CO_2$, the method comprising: absorbing $CO_2$ onto an absorbent solution comprising a $CO_2$-depleted amidoxime compound, wherein absorbing $CO_2$ onto the absorbent solution comprising the $CO_2$-depleted amidoxime compound comprises contacting the absorbent solution with a gas comprising $CO_2$ at a first temperature to form an absorbent solution comprising a $CO_2$-enriched amidoxime compound; and desorbing the $CO_2$ from the absorbent solution comprising the $CO_2$-enriched amidoxime compound, wherein desorbing the $CO_2$ from the absorbent solution comprising the $CO_2$-enriched amidoxime compound comprises heating the absorbent solution comprising the $CO_2$-enriched amidoxime compound to a second temperature greater than the first temperature to remove at least a portion of the $CO_2$ from the $CO_2$-enriched amidoxime compound and form the $CO_2$-depleted amidoxime compound, wherein the second temperature is less than or equal to 80° C.

A second aspect includes any above aspect, further comprising cooling the absorbent solution comprising the $CO_2$-depleted amidoxime compound and again contacting the absorbent solution comprising the $CO_2$-depleted amidoxime compound with the gas comprising $CO_2$ to form the absorbent solution comprising the $CO_2$-enriched amidoxime compound.

A third aspect includes any above aspect, wherein the absorption and desorption of $CO_2$ is a continuous process.

A fourth aspect includes any above aspect, wherein the absorption and desorption of $CO_2$ is a batch process.

A fifth aspect includes any above aspect, wherein the first temperature is less than or equal to 40° C.

A sixth aspect includes any above aspect, wherein the absorbing $CO_2$ onto an absorbent solution comprising a $CO_2$-depleted amidoxime compound is in a scrubber unit.

A seventh aspect includes any above aspect, wherein heating the absorbent solution comprising the $CO_2$-enriched amidoxime compound to the second temperature greater than the first temperature to remove at least a portion of the $CO_2$ from the $CO_2$-enriched amidoxime compound and form the $CO_2$-depleted amidoxime compound occurs outside of the scrubber unit.

An eighth aspect includes any above aspect, wherein cooling the absorbent solution comprising the $CO_2$-depleted amidoxime compound occurs outside of the scrubber unit.

A ninth aspect includes any above aspect, wherein the weight ratio of absorbed $CO_2$ to $CO_2$-depleted amidoxime compound is less than or equal to 1:95 at the second temperature.

A tenth aspect includes any above aspect, wherein the weight ratio of absorbed $CO_2$ to $CO_2$-enriched amidoxime compound is at least 20:80 at the first temperature.

An eleventh aspect includes any above aspect, wherein the $CO_2$-enriched amidoxime compound comprises at least one =NOH functional group and at least one —$NH_2$ functional group, wherein contacting the absorbent solution with the gas comprising $CO_2$ forms a bond between one of the oxygen atoms of the $CO_2$ and one of the hydrogen atoms of the —$NH_2$ functional group and forms a bond between one of the oxygen atoms of the $CO_2$ and a hydrogen atom of the =NOH functional group.

A twelfth aspect includes any above aspect, wherein the $CO_2$-depleted amidoxime compound comprises at least one =NOH functional group and at least one —$NH_2$ functional group, wherein heating the absorbent solution to the second temperature breaks a bond between one of the oxygen atoms of the $CO_2$ and one of the hydrogen atoms of the —$NH_2$ functional group and breaks a bond between one of the oxygen atoms of the $CO_2$ and a hydrogen atom of the =NOH functional group.

A thirteenth aspect includes any above aspect, wherein the $CO_2$-depleted amidoxime compound and the $CO_2$-enriched amidoxime compound comprise N'1,N'6-dihydroxyhexanediimidamide, N' 1,N'4-dihydroxybutanediimidamide, N' 1,N'3-dihydroxypropanediimidamide, N'-hydroxyethanimidamide, or combination of these.

A fourteenth aspect includes any above aspect, wherein the gas comprising $CO_2$ is a gas stream comprising at least 0.1 mol. % $CO_2$.

A fifteenth aspect includes any above aspect, wherein the gas comprising $CO_2$ is a gas stream comprising at least 10 mol. % $CO_2$.

A sixteenth aspect includes any above aspect, wherein the absorbent solution comprises one or more amidoxime compound and one or more solvents.

A seventeenth aspect includes any above aspect, wherein the one or more solvents is water.

An eighteenth aspect includes any above aspect, wherein the absorbent solution comprises from 90 wt. % to 99.9 wt. % of the one or more solvents.

The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that where a first component is described as "comprising" a second component, it is contemplated that, in some embodiments, the first component "consists" or "consists essentially of" that second component. It should further be understood that where a first component is described as "comprising" a second component, it is contemplated that, in some embodiments, the first component comprises at least 10%, at least 20%, at least 30%, at least 40%, at least 50%, at least 60%, at least 70%, at least 80%, at least 90%, at least 95%, or even at least 99% that second component (where % can be weight % or molar %).

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

What is claimed is:

1. A method for absorption and desorption of $CO_2$, the method comprising:
absorbing $CO_2$ onto an absorbent solution comprising a $CO_2$-depleted amidoxime compound, wherein absorbing $CO_2$ onto the absorbent solution comprising the $CO_2$-depleted amidoxime compound comprises contacting the absorbent solution with a gas comprising $CO_2$ at a first temperature to form an absorbent solution comprising a $CO_2$-enriched amidoxime compound; and
desorbing the $CO_2$ from the absorbent solution comprising the $CO_2$-enriched amidoxime compound, wherein desorbing the $CO_2$ from the absorbent solution comprising the $CO_2$-enriched amidoxime compound comprises heating the absorbent solution comprising the $CO_2$-enriched amidoxime compound to a second temperature greater than the first temperature to remove at least a portion of the $CO_2$ from the $CO_2$-enriched amidoxime compound and form the $CO_2$-depleted amidoxime compound, wherein the second temperature is less than or equal to 80° C.

2. The method of claim 1, further comprising cooling the absorbent solution comprising the $CO_2$-depleted amidoxime compound and again contacting the absorbent solution comprising the $CO_2$-depleted amidoxime compound with the gas comprising $CO_2$ to form the absorbent solution comprising the $CO_2$-enriched amidoxime compound.

3. The method of claim 1, wherein the absorption and desorption of $CO_2$ is a continuous process.

4. The method of claim 1, wherein the absorption and desorption of $CO_2$ is a batch process.

5. The method of claim 1, wherein the first temperature is less than or equal to 40° C.

6. The method of claim 1, wherein the absorbing $CO_2$ onto an absorbent solution comprising a $CO_2$-depleted amidoxime compound is in a scrubber unit.

7. The method of claim 6, wherein heating the absorbent solution comprising the $CO_2$-enriched amidoxime compound to the second temperature greater than the first temperature to remove at least a portion of the $CO_2$ from the $CO_2$-enriched amidoxime compound and form the $CO_2$-depleted amidoxime compound occurs outside of the scrubber unit.

8. The method of claim 6, wherein cooling the absorbent solution comprising the $CO_2$-depleted amidoxime compound occurs outside of the scrubber unit.

9. The method of claim 1, wherein the weight ratio of absorbed $CO_2$ to $CO_2$-depleted amidoxime compound is less than or equal to 1:95 at the second temperature.

10. The method of claim 1, wherein the weight ratio of absorbed $CO_2$ to $CO_2$-enriched amidoxime compound is at least 20:80 at the first temperature.

11. The method of claim 1, wherein the $CO_2$-enriched amidoxime compound comprises at least one =NOH functional group and at least one —$NH_2$ functional group, wherein contacting the absorbent solution with the gas comprising $CO_2$ forms a bond between one of the oxygen atoms of the $CO_2$ and one of the hydrogen atoms of the —$NH_2$ functional group and forms a bond between one of the oxygen atoms of the $CO_2$ and a hydrogen atom of the =NOH functional group.

12. The method of claim 1, wherein the $CO_2$-depleted amidoxime compound comprises at least one =NOH functional group and at least one —$NH_2$ functional group, wherein heating the absorbent solution to the second temperature breaks a bond between one of the oxygen atoms of the $CO_2$ and one of the hydrogen atoms of the —$NH_2$ functional group and breaks a bond between one of the oxygen atoms of the $CO_2$ and a hydrogen atom of the =NOH functional group.

13. The method of claim 1, wherein the $CO_2$-depleted amidoxime compound and the $CO_2$-enriched amidoxime compound comprise N'1,N'6-dihydroxyhexanediimidamide, N'1,N'4-dihydroxybutanediimidamide, N'1,N'3-dihydroxypropanediimidamide, N'-hydroxyethanimidamide, or combination of these.

14. The method of claim 1, wherein the gas comprising $CO_2$ is a gas stream comprising at least mol. % $CO_2$.

15. The method of claim 1, wherein the gas comprising $CO_2$ is a gas stream comprising at least mol. % $CO_2$.

16. The method of claim 1, wherein the absorbent solution comprises one or more amidoxime compound and one or more solvents.

17. The method of claim 16, wherein the one or more solvents is water.

18. The method of claim 16, wherein the absorbent solution comprises from 90 wt. % to 99.9 wt. % of the one or more solvents.

* * * * *

UNITED STATES PATENT AND TRADEMARK OFFICE
CERTIFICATE OF CORRECTION

PATENT NO.         : 12,337,274 B2
APPLICATION NO.    : 17/856566
DATED              : June 24, 2025
INVENTOR(S)        : Patel Page 1 of 1

It is certified that error appears in the above-identified patent and that said Letters Patent is hereby corrected as shown below:

In the Claims

Claim 14, Column 14, Line 11, delete "comprising at least mol. % $CO_2$." and replace with -- comprising at least 0.1 mol. % $CO_2$. --.

Claim 15, Column 14, Line 13, delete "comprising at least mol. % $CO_2$." and replace with -- comprising at least 10 mol. % $CO_2$. --.

Signed and Sealed this
Twenty-ninth Day of July, 2025

Coke Morgan Stewart
*Acting Director of the United States Patent and Trademark Office*